United States Patent [19]

Jazenski et al.

[11] 4,167,500

[45] Sep. 11, 1979

[54] AQUEOUS COMPOSITIONS COMPRISING PHENOLIC RESIN AND CROSSLINKING AGENT

[75] Inventors: Peter J. Jazenski, Wattsburg; John S. Sadowski, Erie, both of Pa.

[73] Assignee: Lord Corporation, Erie, Pa.

[21] Appl. No.: 812,289

[22] Filed: Jul. 1, 1977

Related U.S. Application Data

[63] Continuation-in-part of Ser. No. 695,705, Jun. 14, 1976, abandoned.

[51] Int. Cl.$^2$ .............................................. C08L 61/10
[52] U.S. Cl. ................................... 260/29.3; 156/335; 156/390; 156/598; 525/398; 528/3
[58] Field of Search ................... 260/29.3, 615, 67 R, 260/67 FP, 838; 156/335

[56] References Cited

U.S. PATENT DOCUMENTS

| | | | |
|---|---|---|---|
| 2,512,950 | 6/1950 | Londergan | 260/615 |
| 3,080,281 | 3/1963 | Fischer | 260/29.3 X |
| 3,210,309 | 10/1965 | Baker et al. | 260/29.3 |

*Primary Examiner*—Theodore E. Pertilla
*Attorney, Agent, or Firm*—John A. Gazewood

[57] ABSTRACT

Storage-stable, heat-reactive aqueous compositions comprising at least one novolak phenolic resin, at least one formaldehyde polymer, and water, wherein said formaldehyde polymer is present in an amount sufficient to crosslink said novolak resin, are useful for direct bonding of natural and synthetic resins to rigid and non-rigid substrates and as primers for rubber-to-metal adhesives. The herein-described aqueous adhesive systems can have incorporated therein conventional additives such as fillers and the like.

15 Claims, No Drawings

AQUEOUS COMPOSITIONS COMPRISING PHENOLIC RESIN AND CROSSLINKING AGENT

This application is a continuation-in-part of application Ser. No. 695,705, filed June 14, 1976, now abandoned.

This invention relates to aqueous resinous compositions. More particularly, the invention relates to storage-stable, heat-reactive phenolic compositions suitable for use as an adhesive or primer in bonding natural and synthetic elastomers to rigid and non-rigid substrates.

The use of adhesive systems for bonding natural and synthetic elastomers to the same or different elastomers, as well as to non-rigid and other rigid substrates, including metals, natural and synthetic organic and inorganic fibers, and the like, is well-known. To meet the operational requirements imposed by commercial considerations in bonding elastomers to rigid and non-rigid substrates, there have been developed any number of adhesive formulations which have enjoyed some measure of commercial success, with no single formulation being the panacea which provides optimum results in all bonding applications.

In the general case, adhesives for bonding elastomeric materials to rigid substrates are organic solvent-based, i.e., the adhesive ingredients, including film-forming adjuncts, are dissolved in or dispersed into organic solvents. Solvent-based adhesives are employed to a lesser extent for bonding elastomeric materials to non-rigid substrates, particularly synthetic fiber substrates. Although generally exemplary for bonding with respect to elastomeric materials, solvent-based adhesive systems do have several drawbacks. One of the more serious drawbacks is the high cost of the solvent systems, which quite often cannot be reclaimed without prohibitively costly recovery systems. The increasing scarcity of petroleum from which the solvents are derived, and the apparent continued escalation in cost of petroleum stocks promise even higher costs for solvent-based adhesive systems. A further drawback with solvent-based adhesives is the plethora of federal, state, and local legislation in the areas of environmental safety, occupational safety and consumer product safety. While the latter two areas apply to adhesive systems generally, the field of environmental protection regulations are directed primarily to solvent-based adhesives since they are concerned with restrictions on the type and quantity of emissions to the atmosphere.

Quite obviously, water-based adhesive compositions, i.e., the adhesive ingredients are soluble in or dispersed into water, appear less susceptible to conflict with environmental protection regulations than solvent-based systems. Water-based adhesive systems are known, but their use has been principally in applications wherein at least one substrate is porous or can absorb water, and which are not so hydrophobic as to interfere with or inhibit coalescence of the adhesive film former. Because of the economic and environmental advantages which are promised by water-borne systems, there is being expended a significant effort by the adhesive industry to develop water-based adhesives which can approach the performance of solvent-based adhesives.

Generally, solvent-based adhesive systems which are in most demand by industry in elastomer-bonding applications are characterized by an extended shelf-stability, i.e., they can be stored for indefinite periods without undue gelation or loss of adhesive capability; have good layover stability, i.e., parts can be coated with wet adhesive, dried and stored for indefinite periods without substantial loss of adhesion properties; and the adhesive is heat-reactive, i.e., the active adhesive materials remain substantially inert until the bonded assembly is brought to the temperature at which bonding is to be effected. Adhesive compositions meeting these criteria and which also afford an adhesive bond which is resistant to adverse environmental conditions are especially advantageous.

While water-based adhesive systems have been proposed which can provide adequate adhesion, such systems are generally deficient with respect to stability. For example, even the best of the known water-based systems must be used within about two weeks after being prepared before gelation and/or loss of adhesive capability occurs. There remains a need for water-based adhesive compositions which are stable for extended periods of time, retain their strength during storage, and otherwise exhibit adhesive characteristics comparable to commercial solvent-based adhesive systems.

In accordance with the present invention, there are provided storage-stable, heat-reactive, water-based adhesive compositions comprising at least one phenolic resin, an effective amount of at least one methylene-donor crosslinking agent and water.

Solvent-based adhesive systems comprising at least one heat-reactive phenolic resole resin have been employed for bonding elastomers to metal substrates, and as primers for elastomer adhesives. Resole resins can be emulsified in water to afford aqueous adhesive systems having good adhesion; unfortunately, the stability of such thermosetting resoles in water is limited to a few weeks at ambient temperatures. There have been proposed aqueous adhesive systems comprising phenolic novolak resins and common curatives such as hexamethylenetetramine and formaldehyde. Such novolak systems afford results which are quite promising with respect to one or more of adhesion, environmental resistance, and stability; unfortunately, they are generally deficient with respect to at least one of these parameters and thus are considered unsatisfactory for commercial use. In contrast to such known adhesive systems, the water-based adhesive compositions of this invention have an indefinite shelf-stability at ambient temperatures and cure at elevated temperatures, i.e., they are heat-reactive, to afford adhesive bonds comparable to solvent-based adhesive systems with respect to adhesion and environmental resistance. In addition, the compositions have highly desirable film properties, are resistant to sweep and flow and can be used as a single-coat adhesive or a primer (in combination with a cover-coat elastomer adhesive) for bonding vulcanizable natural and synthetic rubbers to rigid and non-rigid substrates.

The phenolic resins which are suitable for use in the practice of the invention are selected from the group consisting of thermoplastic phenol-aldehyde condensates which are commonly called phenolic novolak resins. Such resins are prepared according to well-known methods by condensing phenolic compounds and aldehydes, usually under acidic to neutral conditions, with the phenolic material being present in the reaction mixture in more than stoichiometric amounts. Also included within the purview of novolak resins are the reaction products obtained by further condensing a formed resole resin with additional phenolic compound. For more detailed information regarding novolak resins, including methods of preparation, see Carswell "Phenoplasts," Interscience Publishers, Inc., New York, N.Y., (1947), which treatise is herein incorporated by reference. Suitable novolak resins include resinous oils as well as pulverulent solids. Novolak resins are permanently fusible and are not converted to an infusible, crosslinked state by the application of heat alone. Novolak resins can be converted to an infusible state by the addition thereto of a crosslinking agent such as a methylene donor.

In forming the phenolic novolak resins which are employed in the practice of this invention, there can be utilized a variety of phenolic compounds, i.e., both mononydroxy and polyhydroxy phenols, including such compounds having at least one aromatic nucleus, and substituted derivatives thereof, and including mixtures of such phenolic compounds. Among the substituent groups which can be attached to the nucleus of the phenolic compound are alkyl, alkoxy, amino, halogen and the like. Representative phenolic compounds include, without being limited thereto, phenol, p-t-butyl-phenol, p-phenylphenol, p-chlorophenol, p-alkoxy-phenol, o-cresol, m-cresol, o-chlorophenol, m-bromo-phenol, 2-ethylphenol, amyl phenol, nonyl phenol, cashew nut shell liquid, resorcinol, orcinol, phloroglucinol, pyrocatechol, pyrogallol, salicylic acid, bis-phenol A, bis-phenol S, and the like. Particularly preferred novolak resins are obtained when the phenolic precursors comprise:

(a) 100 mol percent of at least one polyhydroxy phenol such as resorcinol, phloroglucinol, pyrogallol and the like, with resorcinol being particularly preferred;

(b) from about 50 to about 98, preferably about 60 to about 98, mole percent of at least one polyhydroxy phenol and from about 50 to about 2, preferably about 40 to about 2, mole percent of at least one monohydric phenol, the nucleus of which is not substituted with a hydrocarbon radical, i.e., a radical containing only carbon and hydrogen atoms, although the nucleus can be substituted with groups such as alkoxy, amino, halogen, and the like;

(c) from about 10 to about 98, preferably about 50 to about 98 mole percent of at least one polyhydroxy phenol and from about 90 to about 2, preferably about 50 to about 2, mole percent of at least one monohydric phenol, the nucleus of which is substituted with at least one alkyl group having from 1 to 22 carbon atoms; and (d) 100 mole percent of at least one monohydric phenol, the nucleus of which is substituted with at least one alkyl group having from 1 to 22 carbon atoms; said mole percents being based on total moles of phenolic compound. When forming modified novolak resins by reacting a preformed phenolic resol or phenolic novolak with additional phenolic compound, it is preferred that such additional phenolic compound be selected from the group consisting of polyhydroxy phenols and monohydroxy phenols, the nucleus of which is substituted with at least one alkyl group having from 1 to 22 carbon atoms.

Representative aldehydes which can be condensed with phenolic compounds to form novolak resins include, without being limited thereto, formaldehyde, acetaldehyde, propionaldehyde, isobutyraldehyde, 2-ethylbutyradlehyde, 2-methylpentaldehyde, 2-ethylhexaldehyde, as well as compounds which decompose to formaldehyde, such as paraformaldehyde, trioxane, furfural, hexamethylenetetramine, acetals which liberate formaldehyde on heating, benzaldehyde, and the like.

In order to make the novolak resins, including those suitable for use in the practice of the invention, infusible, such resins must be further reacted with a methylene donor or a source of methylene bridges or linkages. Among the numerous organic compounds which have been employed as methylene donors are formaldehyde; compounds which decompose to formaldehyde such as paraformaldehyde, s-trioxane, hexamethylene tetramine, anhydroformaldehydeaniline, ethylene diamine formaldehyde; methylol derivatives of urea and formaldehyde; acetaldehyde; furfural; and the like. These organic compounds are considered methylene donors in that they effect rapid crosslinking of heat fusible novolak resins with methylene or equivalent linkages by the application of heat. While these materials are effective to crosslink the novolak phenolic resin adhesive systems of the present invention, they are ineffective in other critical areas such as film properties, stability and the like. Thus it is a critical feature of the present invention that there be employed certain hereinafter defined high molecular weight aldehyde homopolymers and copolymers as the crosslinking agent.

The high molecular weight aldehyde homopolymers and copolymers which must be employed as crosslinking agents in the practice of the present invention are selected from the group consisting of acetal homopolymers, acetal copolymers, gamma-polyoxymethylene ethers having the characteristic structure

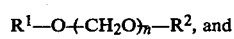

$R^1-O+CH_2O)_n-R^2$, and polyoxymethylene glycols having the characteristic structure

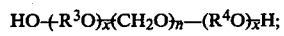

$HO+(R^3O)_x(CH_2O)_n-(R^4O)_xH$;

wherein $R^1$ and $R^2$ can be the same or different and each is an akyl group having from 1 to 8, preferably 1 to 4, carbon atoms; $R^3$ and $R^4$ can be the same or different and each is an alkylene group having from 2 to 12, preferably 2 to 8, carbon atoms; n is greater than 100, and is preferably in the range from about 200 to about 2000; and x is in the range from 0 to 8, preferably 1 to 4, with at least one x being equal to at least 1. The high molecular weight aldehyde homopolymers and copolymers are further characterized by a melting point of at least 75° C., i.e., they are substantially inert with respect to the novolak resin until heat activated; and by being substantially completely insoluble in water at a temperature below the melting point. The acetal homopolymers and acetal copolymers are well-known articles of commerce (Delrin ® acetal homopolymers, E. I. du Pont de Nemours & Co., Inc., and Celcon ® acetal copolymers, Celanese Corporation). The polyoxymethylene materials are also well-known and can be readily synthesized by the action of monoalcohols having from 1 to 8 carbon atoms or dihydroxy glycols and ether glycols on polyoxymethylene glycols in the presence of an acidic catalyst. A representative method of preparing these crosslinking agents is described in Londergan U.S. Pat. No. 2,512,950. A particularly preferred crosslinking agent for use in the practice of the invention is 2-polyoxymethylene dimethyl ether.

In forming the water-based adhesive compositions of the present invention, the phenolic novolak resin, curing agent, and water will be combined in amounts sufficient to afford a shelf-stable, heat-reactive composition comprising (i) 100 parts by weight of at least one water-soluble or water-dispersible phenolic novolak resin;

(ii) an effective amount, preferably from about 2 to 60, more preferably from about 5 to about 30, parts by weight per 100 parts by weight of novolak resin, of crosslinking agent; and (iii) water, in an amount sufficient to afford a dispersion having a total solids content (TSC) based on novolak resin in the range from about 5 to about 75, preferably about 10 to about 60 percent.

The herein-described compositions are water-dilutable, i.e., the individual ingredients are soluble or dispersible in water alone or with the addition of a minor amount of organic solvents which are largely or completely miscible with water, e.g, mono- and d-alkyl ethers of ethylene glycol or diethylene glycol, ethylene glycol, propylene glycol, isopropylene glycol, n-butylene glycol, diacetone alcohol, ketones such as acetone, methyl ethyl ketone, methyl isobutyl ketone, and the like.

The water-dilutable adhesive systems of the invention can optionally contain other well-known additives including plasticizers, fillers, pigments, reinforcing agents and the like, in amounts conventionally employed by those skilled in the adhesive arts.

In forming the adhesive compositions of the invention, it is preferred that the novolak phenolic resin be dissolved in water, or, if water-insoluble, dispersed into water, preferably to form an emulsion, employing conventional practices. The remaining ingredients can be admixed into the aqueous novolak composition in any order and by any conventional means so as to provide a final homogeneous solution or dispersion of adhesive materials in the carrier water. It is preferred that solid insoluble materials be finely ground to preferably afford a colloidal adhesive composition. The resulting one-package water-based compositions are storage-stable at ambient temperatures, have excellent pot-life, and heat activated, i.e., are cured or hardened by heating at an elevated temperature. The compositions also exhibit excellent layover qualities, i.e., the compositions can be applied to a substrate, allowed to dry and remain in storage in their dry and uncured state for an extended time, and then cured with the aid of heat.

At the time of use, the adhesive compositions of this invention can be applied to either or both of the surfaces to be adhesively joined in any conventional manner, by calendaring or brushing, allowed to dry and then cured or hardened by heating to an elevated temperature, such as a temperature range normally employed in vulcanizing natural and synthetic rubbers, and preferably in the range of about 135° C. to about 235° C.

The adhesive systems of the invention are useful for direct bonding of natural and synthetic rubbers to a variety of rigid and non-rigid substrates, including metals, natural and synthetic organic and inorganic fibers, and the like. The herein-described adhesive systems are useful as well as priming compositions for treating such rigid and non-rigid substrates in combination with both solvent-based and water-based rubber adhesives. In addition, the adhesive systems of this invention can be combined with latices such as vinyl pyridine rubber to form RFL-type adhesives for bonding fabric-to-rubber and which afford effective adhesive bonds and also afford significantly increased working time. In addition to the unexpectedly good storage stability, the compositions of this invention exhibit desirable film properties; are highly resistant to sweep and flow when employed either as a one-pack primary adhesive, e.g., direct rubber-to-metal bonding, or as a primer composition as part of a two-pack, i.e., primer coat-rubber adhesive coat, system; and are highly resistant to adverse environmental conditions.

The following examples are provided to illustrate the invention. All parts and percentages are by weight unless otherwise indicated.

EXAMPLE I

Into a reactor equipped with a mixing device are charged 300 parts of dry methanol and 702 parts paraformaldehyde. The mixture is heated to 70° C. and there is added a solution of 0.7 parts sodium hydroxide in 10 parts dry methanol. To the reaction mixture there is added 264 parts concentrated sulfuric acid. The temperature is maintained below 80° C. during this addition. The reaction mixture is cooled to room temperature; washed with aqueous sodium hydroxide; and heated for two hours at 60° C. The solid product is recovered by filtration, washed with aqueous sodium hydroxide, and again heated for two hours at 60° C. The reaction mixture is filtered and the solid polyoxymethylene dimethyl ether product is washed with water until the formaldehyde odor is substantially eliminated.

EXAMPLE II

A novolak phenolic resin is prepared by reacting 13.21 moles resorcinol, 0.2 moles p-nonylphenol and 8.0 moles formalin (37% sol'n.) in the presence of a catalytic amount of hexamethylenetetramine at 90° C. The resulting resin is dispersed in water with sodium caseinate at 31% N.V. An adhesive composition is prepared by dispersing into the thus-prepared novolak resin emulsion 25 parts by weight per 100 parts by weight of novolak resin of $\gamma$-polyoxymethylene dimethyl ether prepared according to the procedure of Example I. The adhesive composition is employed to bond to non-primed, grit-blasted steel a sulfur-vulcanizable acrylonitrile-butadiene elastomer stock. The assembly is cured at 154° C. for 40 minutes. Peel adhesion, boiling water resistance and hot oil resistance tests are performed. Peel adhesion tests are effected according to ASTM D-429, method B modified to 45°. Boiling water resistance is measured by immersing test samples in boiling water for 2 hours. Failure is determined by peeling rubber from metal with pliers immediately after removal from the water. This test is more severe than standard tests which cools the sample to ambient temperature before peeling. Hot oil resistance is determined by immersing test samples in ASTM #1 reference oil for 70 hrs. at 144° C., cooling the sample to ambient temperature, wiping the sample free of oil and peeling rubber from metal with pliers. In each instance, rubber-tearing bonds (100 R) are obtained. The composition is equally as effective after being aged for 6 weeks at 51° C. (125° F.). Substantially no change in appearance or viscosity of the compositions is noted after storage for six months at 51° C.

When paraformaldehyde is substituted for $\gamma$-polyoxymethylene dimethyl ether in the above-described adhesive the resulting composition gels upon standing overnight.

EXAMPLE III

A phenolic solution is prepared by dissolving 100 parts by weight resorcinol-formaldehyde novolak phenolic resin (SRF-1501$^a$, Schenectady Chemicals, Inc.)

in 295 parts distilled water containing 12.5 parts concentrated ammonium hydroxide solution. Into the phenolic solution there is dispersed 25 parts γ-polyoxymethylene dimethyl ether to afford an aqueous adhesive composition. The adhesive composition is employed to bond non-primed, grit-blasted steel to acrylonitrile-butadiene elastomer stock. The bonded assembly is cured at 154° C. for 40 minutes. Peel adhesion and boiling water resistance tests are performed according to the procedure of Example II with the following results:

Peel strength, lb./in. 120
Peel adhesion, failure 95 R
Boiling water resistance 95 R a=believed to be the trimeric methyleneamino acrylonitrile-catalyzed condensation product of resorcinol and formaldehyde.

EXAMPLE IV

A novolak resin prepared by reacting 1.425 moles resorcinol, 0.027 moles cashew nut shell liquid and 1.206 moles formalin (37% solution) in the presence of a catalytic amount of hexamethylenetetramine. The resulting resin is dispersed with sodium caseinate at 28.7% N.V. The novolak resin dispersion is formulated into an aqueous adhesive system having the following composition

|  | Parts by Weight |
|---|---|
| Novolak resin dispersion | 379.2 |
| γ-Polyoxymethylene dimethyl ether | 19 |
| Silica | 25.7 |
| Titanium dioxide | 18 |
| Carbon black | 3.9 |
| Anionic surfactant (Tamol 850, Rohm & Haas Co.) | 2.52 |
| Water (to 25.8% total solids content) | |

The thus-prepared aqueous adhesive composition is employed as a single-coat adhesive to bond to non-primed, grit-blasted steel a sulfur vulcanizable acrylonitrile-butadiene elastomer (NBR) and as a metal primer coat for the bonding of natural and synthetic elastomers to metal (steel) with a commercially available solvent-based covercement. The results are reported below:

| Elastomer | Covercement | Peel, lbs./in. | Peel Adhesion, Failure | Boiling Water 2 hrs. |
|---|---|---|---|---|
| NBR | — | 92 | 95 R | 100 R |
| Natural rubber | Chemlok ® 220[a] | 48 | 100 R | 95 R |
| SBR | Chemlok ® 220 | 124 | 100 R | — |
| NBR | [b] | 90 | 100 R | — |
| Natural rubber | [b] | 51 | 100 R | 90 R |
| NBR | [c] | 67 | 100 R | 100 R |

®Trademark, Lord Corporation, Erie, Pennsylvania
[a] = heat reactive halogenated rubber solvent-based adhesive, Hughson Chemicals, a division of Lord Corporation.
[b] = control adhesive system: Chemlok 205 primer (solvent-based heat reactive phenolic resole primer, Hughson Chemicals) with Chemlok 220 rubber adhesive covercement.
[c] = control adhesive system: Chemlok 205, no primer coat.

The data demonstrate the utility of the herein-described aqueous adhesive systems as a primary one-coat adhesive and as a primer for rubber-to-metal adhesive applications. The data further demonstrate the bond capability of the aqueous adhesives of the invention is substantially equivalent to commercial solvent-based rubber-to-metal adhesive systems.

EXAMPLE V

Cashew nut shell liquid and resorcinol are reacted with formaldehyde in the presence of a catalytic amount of hexamethylenetetramine at a phenolic:formaldehyde molar ratio of 1.70 to afford a phenolic novolak resin (6.7% cashew nut shell liquid/93.3% resorcinol). The resin is emulsified with sodium caseinate to afford an emulsion having a total solids content, based on novolak resin, of 40%.

Aqueous adhesive compositions are formulated from the thus-prepared resin as follows:

| Composition | A | B |
|---|---|---|
| Novolak resin | 90 | 80 |
| γ-Polyoxymethylene dimethyl ether | 10 | 20 |
| Water (to 40% TSC, based on novolak resin) | | |

The adhesive compositions are employed to bond a sulfur-vulcanizable acrylonitrile-butadiene rubber stock to non-primed, grit-blasted steel. The adhesive-bonded assemblies are cured at 154° C. for 40 minutes. Peel adhesion, boiling water resistance and hot oil resistance tests are performed according to the procedure of Example II. The results are reported in the following table:

| Adhesive | Peel lb./in. | Adhesion Failure | Boiling Water | Hot Oil |
|---|---|---|---|---|
| Chemlok 205 | 67 | 100 R | 100 R | 100 R |
| A | 84 | 90 R | 100 R | 85 R |
| B | 104 | 100 R | 100 R | 100 R |

The data demonstrate that the aqueous adhesives of the invention afford a bonding capacity at least equivalent to commercial solvent-based rubber-to-metal adhesives.

EXAMPLE VI

Resorcinol and nonyl phenol are reacted with formaldehyde in the presence of a catalytic amount of hexamethylenetetramine at a total phenol:formaldehyde molar ratio of 1.7:1 to afford a novolak cocondensate resin (97 mole % resorcinol/3 mole % nonylphenol). The solid resin is washed to remove formaldehyde odor. The wet resin is dried under vacuum. The dry resin is dispersed in water with sodium caseinate at 40% N.V. to afford Emulsion A.

Resorcinol and cashew nut shell liquid are reacted with formaldehyde in the presence of a catalytic amount of hexamethylenetetramine at a total phenol:formaldehyde molar ratio of 1.7:1 to afford a novolak cocondensate resin (96.8 mole % resorcinol/3.2 mole % cashew nut shell liquid). The resin is washed to remove formaldehyde odor. The wet resin is divided into equal portions and one portion is dried under vacuum. The wet and dry resin portions are separately dispersed in water with sodium caseinate at 40% N.V. to afford Emulsions B and C, respectively.

The thus prepared emulsions are employed to prepare aqueous adhesive compositions according to the following recipes:

| Adhesive | I | II | III |
|---|---|---|---|
| Emulsion A | 100[a] | — | — |
| Emulsion B | — | 100[a] | — |
| Emulsion C | — | — | 100[a] |
| γ-Polyoxymethylene dimethyl ether | 25 | 25 | 25 |

| Adhesive | I | II | III |
|---|---|---|---|
| Water | b | b | b |

$a=$ parts by weight of novolak resin.
$b=$ water in an amount sufficient to provide 45% TSC.

The thus prepared adhesive compositions are employed to bond sulfur-vulcanizable acrylonitrile-butadiene elastomer stock to untreated and treated cold rolled steel. The bonded assemblies are cured at 154° C. for 40 minutes. Peel adhesion and environmental resistance (immersion in boiling water for two hours, immersion in hot oil for 70 hours at 149° C., and exposure to 5% sodium chloride spray at 100% relative humidity) tests are performed. The results are reported in the following table.

TABLE

| | Peel Adhesion, Room Temperature Pull | | | | | | | |
|---|---|---|---|---|---|---|---|---|
| Surface | Adhesive | | | | | | Chemlok 205 | |
| | I | | II | | III | | | |
| Treatment | lb./in. | Failure | lb./in. | Failure | lb./in. | Failure | lb./in. | Failure |
| None | 84 | 40R | 24 | 7R | 30 | 8R | 150 | 99R |
| Solvent-wiped, grit-blasted | 124 | 100R | 125 | 98R | 104 | 100R | 120 | 100R |
| Phosphatized | 124 | 100R | 118 | 96R | 117 | 96R | 104 | 100R |

| Environmental Resistance | | | | | |
|---|---|---|---|---|---|
| A. Solvent-wiped, grit-blasted steel | | | | | |
| | Hot Oil | | | Water, | |
| Adhesive | Mil-L-23699 | Mil-L-7808 | Reference Fuel B | R.T. 1 wk. | Salt Spray 100 hrs. |
| I | 100 R | 100 R | 100 R | 100 R | 92 R |
| II | 100 R | 100 R | 100 R | 100 R | 92 R |
| III | 100 R | 100 R | 100 R | 67 R | 80 R |
| Chemlok 205 | 100 R | 100 R | 87 R | 100 R | 70 R |
| B. Phosphatized Steel | | | | | |
| | Hot Oil | | | Water, | |
| Adhesive | Mil-L-23699 | Mil-L-7808 | Reference Fuel B | R.T. 1 wk. | Salt Spray 100 hrs. |
| I | 100 R | 100 R | 97 R | 98 R | 97 R |
| II | 100 R | 100 R | 93 R | 97 R | 96 R |
| III | 100 R | 100 R | 97 R | 98 R | 100 R |
| Control | 100 R | 100 R | 97 R | 100 R | 100 R |

The data demonstrate the excellent adhesion and environmental resistance afforded by the aqueous systems of the invention. As is generally the case, bonding is enhanced when the substrate is cleaned or otherwise treated prior to applying the adhesive.

EXAMPLE VII

A cashew nut shell liquid/resorcinol/formaldehyde novolak resin is prepared and emulsified according to the procedure of Example V. An aqueous adhesive composition is prepared by dispersing into the resin emulsion 25 parts γ-polyoxymethylene dimethyl ether per 100 parts novolak resin. The initial pH of the adhesive system is 6.4. The pH of aliquot portions is adjusted to 6.6, 6.8, 7.0, 7.2, 7.4, 7.8 and 8.0 with concentrated sodium hydroxide solution. The resulting adhesives are utilized to hand solvent-wiped, grit-blasted steel to acrylonitrile-butadiene elastomer stock. The results are reported in the following table:

| pH | Adhesion lb./in. | Failure |
|---|---|---|
| 6.6 | 100 | 99 R |
| 6.8 | 132 SB | 100 R |
| 7.0 | 100 | 100 R |
| 7.2 | 103 | 99 R |
| 7.4 | 101 | 100 R |
| 7.6 | 123 | 100 R |
| 7.8 | 99 | 100 R |
| 8.0 | 90 | 80 R |

The data indicate that excellent bond results are obtained over a wide range of pH of the aqueous adhesive systems. Generally, the pH will not exceed about 7.9, and is preferably in the range of about 6.2–7.7, most preferably about 6.4–7.0.

EXAMPLE VIII

Cashew nut shell liquid, resorcinol and formaldehyde are reacted according to the procedure of Example V to afford novolak resins comprising 6.7 mole percent cashew nut shell liquid and 93.7 mole percent resorcinol having varied phenol:formaldehyde ratios. The resins are divided into aliquot portions, and emulsified with sodium caseinate according to the procedure of Example V. Prior to emulsification, certain of the aliquot portions are dehydrated. Aqueous adhesive compositions are prepared from each portion according to the procedure of Example VII. The compositions are employed to bond sulfur-vulcanizable acrylonitrile-butadiene elastomer to solvent-wiped, grit-blasted steel. The results are reported in the following table:

| Novolak P/F$^a$ | Resin Dehydrated | Room Temperature Pull | | Boiling Water |
|---|---|---|---|---|
| | | lb./in. | Failure | |
| 1.51 | No | 98 | 98 R | 95 R |
| 1.51 | Yes | 113 | 100 R | 100 R |
| 1.94 | No | 105 | 80 R | — |
| 1.94 | Yes | 107 | 57 R | 100 R |
| 1.70 | No | 126 | 100 R | 100 R |
| 1.70 | Yes | 125 | 100 R | 100 R |

$a=$ total phenolic:formaldehyde ratio.

The data demonstrate that excellent adhesion can be obtained over a wide phenolic:formaldehyde ratio range and, although the best results are obtained with dehydrated resins, wet resins also provide excellent adhesive bonds. Generally, the phenolic:formaldehyde ratio will be in the range of 1.1–4:1, and is most preferably in the range of 1.4–2:1. No advantage has been seen at ratios above 4:1.

EXAMPLE IX

Several novolak resins were prepared and emulsified following the procedure of Example V; with certain of the resins being dehydrated prior to emulsification. The emulsions are employed to formulate aqueous adhesive systems according to the procedure of Example VII. The adhesives are employed to bond sulfur-vulcanizable acrylonitrile-butadiene elastomer to solvent-wiped, grit-blasted steel and to phosphatized steel. The results are reported in the following table:

| Adhesive System | A | B | C | D | E | F | G | H | I |
|---|---|---|---|---|---|---|---|---|---|
| Novolak resin composition Phenolic portion, Mole % | | | | | | | | | |
| Cashew nut shell liquid | 6.7 | 6.7 | | | | 3.1 | 3.1 | 3.1 | 3.2 |
| Nonyl phenol | | | | 3 | 6 | | | | |
| o-cresol | | | 15 | | | | | | |
| Resorcinol | 93.3 | 93.3 | 85 | 97 | 94 | 96.9 | 96.9 | 96.9 | 96.8 |
| Phenolic:formaldehyde | 1.70 | 1.51 | 1.70 | 1.70 | 1.70 | 1.70 | 1.70 | 1.70 | 1.70 |
| Dehydrated | Yes | Yes | Yes | No | No | No | No | No | Yes |
| Adhesive composition, pH | 6.11 | 6.02 | 6.19 | 6.41 | 6.39 | 6.29 | 6.26 | 6.42 | 6.95 |
| Room temperature pull Grit-blasted steel | | | | | | | | | |
| Peel adhesion,lb./in. | 98 | 85 | 96 | 120 | 114 | 116 | 86 | 97 | 95 |
| Failure | 87R | 99R | 99R | 99R | 100R | 92R | 90R | 100R | 100R |
| Phosphatized steel | | | | | | | | | |
| Peel adhesion | 108 | 115 | 115 | 115 | 115 | 110 | 102 | 104 | 97 |
| Failure | 91R | 94R | 98R | 98R | 97R | 97R | 92R | 86R | 97R |

The data demonstrate the excellent versatility with respect to compositional formulation afforded by the adhesve systems of the invention.

EXAMPLE X

A novolak resin is prepared by reacting 1.425 moles resorcinol, 0.028 moles cashew nut shell liquid and 1.10 moles formaldehyde at 90° C. in the presence of a catalytic amount of hexamethylenetetramine according to the procedure of Example II. The resulting resin is emulsified in water with sodium caseinate at 28.8 total solids content. The resin emulsion is employed to formulate an aqueous tire cord dip adhesive having the following composition:

| | PBW |
|---|---|
| Styrene-butadiene-vinyl pyridine latex$^a$ | 60$^b$ |
| Novolak resin emulsion | 36$^b$ |
| γ-Polyoxymethylene dimethyl ether | 25 |
| Water, to 32.1% TSC | |

$^a=$ Goodrite 2828 emulsion, B. F. Goodrich Chemical Company.
$^b=$ PBW resin solids.

The adhesive is used to bond sulfur-vulcanizable SBR elastomer stock to nylon with the following results:
Peel adhesion, lbs./in. 65–70
After the adhesive is aged six weeks at 52° C., the bonding of SBR elastomer stock to nylon is repeated with the following result:
Peel adhesion, lbs./in. 88–96.
A similar tire cord dip adhesive employing resorcinol and hexamethylenetetramine affords substantially the same results (~70 lbs./in. peel adhesion) when freshly prepared; however, such an adhesive is substantially gelled after two weeks aging at 52° C.

EXAMPLE XI

Several aqueous adhesive systems are prepared from novolak phenolic resins and the following methylene donors: hexamethylenetetramine, formaldehyde, paraformaldehyde, trioxane, trimethylol phenol, methyl aziridinyl phosphine oxide, trimethylol cyanurate, tris(hydroxymethyl)nitromethane, hexamethylene diamine carbamate, hydroxymethyl diacetone acrylamide, poly(N-methylol acrylamide), poly(vinyl pyrollidone), poly(hydroxymethyl diacetone acrylamide), adduct of 2-amino-2-methyl-1-propanol and formaldehyde, adduct of tris(hydroxymethyl)aminomethane and formaldehyde, triethylene melamine, methoxy methyl melamine, dimethylolethylene urea, hexamethoxymethyl melamine, dihydroxydimethylol ethylene urea, butylated dimethylolethylene urea, urea-formaldehyde condensate, ethylene-urea-formaldehyde condensate and melamine-formaldehyde condensate. In no instance is there obtained a satisfactory combination of properties including adhesion, environmental resistance, film properties and system stability.

From the foregoing examples, it can be appreciated that a versatile, storage-stable, heat-convertible water-based composition has been developed which is effective as a single-coat primary adhesive and as well as part of a two-pack primer-covercoat adhesive system. It can also be appreciated that all combinations of ingredients do not serve with equal effectiveness and that each combination may require adjustment to reach optimum performance.

EXAMPLE XII

Emulsion A of Example VI is employed to prepare aqueous adhesive compositions according to the following receiptes:

| Adhesive | XII-A | XII-B |
|---|---|---|
| Emulsion A | 100 | 100 |
| Polyacetal | 25$^a$ | — |
| γ-Polyoxymethylene dialkyl ether | — | 25$^b$ |
| Water | c | d |

$^a=$ Formaldehyde-ethylene oxide copolymer (Celcon ® M-90, Celanese Corporation).
$^b=$ γ-Polyoxymethylene isopropyl methyl ether.
$^c=$ Water in an amount sufficient to provide 25% TSC.
$^d=$ Water in an amount sufficient to provide 45% TSC.

The thus-prepared adhesive compositions are employed to bond sulfur-vulcanized acrylonitrile-butadiene elastomer stock to solvent-wiped, grit-blasted, cold-rolled steel. The bonded assemblies are cured at 154° for 40 minutes. Peel adhesion tests are performed with the following results:

| Adhesive | Peel Adhesion, Room Temperature Pull | |
|---|---|---|
| | lb./in. | Failure |
| XII-A | 90 | 80 R |
| XII-B | 116 | 100 R |

The data demonstrate that high molecular weight polyacetals and γ-polyoxymethylene dialkyl ethers are effective in affording excellent adhesive systems in accordance with the invention.

What is claimed is:

1. A heat-reactive water-based adhesive composition comprising:
   (a) at least one water-dispersible novolak phenolic resin;
   (b) an effective amount of at least one methylene donor selected from the group consisting of acetal homopolymers and acetal copolymers,
   said methylene donor having an average degree of polymerization greater than 200, a melting point of at least 75° C. and being substantially insoluble in water at a temperature below the melting point; and
   (c) water;
   the amount of water being sufficient to afford an aqueous dispersion having a total solids content, based on novolak resin, in the range from about 5 to about 75 percent.

2. A heat-reactive water-based adhesive composition comprising
   (a) at least one at least water-dispersible novolak phenolic resin;
   (b) an effective amount of at least one methylene donor selected from the group consisting of gamma-polyoxymethylene ethers having the characteristic structure

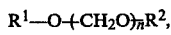

wherein $R^1$ and $R^2$ can be the same or different and each is an alkyl radical having from 1 to 8 carbon atoms, and n is at least 100; and
   (c) water, the amount of water being sufficient to afford an aqueous dispersion having a total solids content, based on novolak resin, in the range from about 5 to about 75 percent.

3. A composition according to claim 2, wherein the amount of methylene donor is in the range from about 2 to about 60 parts by weight per 100 parts by weight of novolak resin.

4. A composition according to claim 3, wherein each of $R^1$ and $R^2$ is methyl.

5. A composition according to claim 2, wherein said novolak resin is selected from the group consisting of (a) novolak resins wherein the phenolic precursor comprises 100 mole percent of at least one polyhydroxy phenol;
(b) novolak resins wherein the phenolic precursor comprises about 50 to about 98 mole percent of at least one polyhydroxy phenol and about 50 to about 2 mole percent of at least one monohydric phenol, the nucleus of which monohydric phenol is not substituted with a hydrocarbon radical;
(c) novolak resins wherein the phenolic precursor comprises about 10 to about 98 mole percent of at least one polyhydric phenol and about 90 to about 2 mole percent of at least one monohydric phenol, the nucleus of which monohydric phenol is substituted with at least one alkyl group having from 1 to 22 carbon atoms;
(d) novolak resins wherein the phenolic precursor comprises 100 mole percent of at least one monohydric phenol, the nucleus of which is substituted with at least one alkyl group having from 1 to 22 carbon atoms;
(e) modified novolak resins formed by reacting a preformed phenolic resole resin with additional phenolic precursor, said mole percents being based on total moles of phenolic precursor.

6. A composition according to claim 5, wherein said phenolic precursor comprises 100 mole percent resorcinol.

7. A composition according to claim 6, wherein the amount of said methylene donor is in the range from about 2 to about 60 parts by weight per 100 parts by weight of novolak resin.

8. A composition according to claim 7, wherein each of $R^1$ and $R^2$ is methyl.

9. A composition according to claim 7, wherein the ratio of phenol:aldehyde is in the range of about 1.4–4:1.

10. A composition according to claim 5, wherein said phenolic precursor comprises about 50–98 mole percent resorcinol and about 50–2 mole percent cashew nut shell liquid, and the ratio of phenol:aldehyde is in the range of about 1.4–4:1.

11. A composition according to claim 10, wherein each of $R^1$ and $R^2$ is methyl.

12. A composition according to claim 5, wherein the phenolic precursor comprises about 50–98 mole percent resorcinol and about 50–2 mole percent nonyl phenol; and the ratio of phenol:aldehyde is in the range of about 1.4–4:1.

13. A composition according to claim 12, wherein each of $R^1$ and $R^2$ is methyl.

14. A composition according to claim 2, wherein said novolak resin comprises cashew nut shell liquid modified phenolic resole.

15. A composition according to claim 7, wherein said novolak resin comprises the trimeric methylene amino acrylonitrile-catalyzed condensation product of resorcinol and formaldehyde.

* * * * *